United States Patent [19]
Bechtle et al.

[11] Patent Number: 5,387,897
[45] Date of Patent: * Feb. 7, 1995

[54] MOTOR VEHICLE WITH A CENTRAL LOCKING SYSTEM AND AN ANTI-THEFT ALARM SYSTEM

[75] Inventors: Rolf Bechtle, Bietigheim Bissingen; Walter Häcker, Tamm, both of Germany

[73] Assignee: Porsche AG, Weissach, Germany

[*] Notice: The portion of the term of this patent subsequent to Jun. 1, 2010 has been disclaimed.

[21] Appl. No.: 966,193
[22] PCT Filed: Jul. 6, 1991
[86] PCT No.: PCT/EP91/01264
§ 371 Date: Mar. 24, 1993
§ 102(e) Date: Mar. 24, 1993
[87] PCT Pub. No.: WO92/02390
PCT Pub. Date: Feb. 20, 1992

[30] Foreign Application Priority Data

Jul. 31, 1990 [DE] Germany ............... 4024300

[51] Int. Cl.6 ............................ B60R 25/10
[52] U.S. Cl. .................. 340/426; 340/542; 70/264; 307/10.2
[58] Field of Search ........... 340/426, 430, 542, 423.5; 70/264; 307/10.2

[56] References Cited

U.S. PATENT DOCUMENTS 4,754,255  6/1988  Sanders et al.
5,216,406  6/1993  Bechtle ................ 340/426

FOREIGN PATENT DOCUMENTS 3413776 10/1985 Germany.
3413775 11/1985 Germany.
3447037 10/1986 Germany.
3607784  9/1987 Germany.
3736776  1/1989 Germany.
8810641  1/1989 Germany.
3737209  5/1989 Germany.
3821561 12/1989 Germany.

OTHER PUBLICATIONS

ATZ Automobiltechnische Zeitschrift, Bd., 91, Nr. 6, Jun. 1989, pp. 309-318.
Radio Plans, Nr. 460, Mar. 1986, pp. 27-33.
Patent Abstracts of Japan, vol. 9, No. 183, Jul. 30, 1985.

Primary Examiner—Jeffery A. Hofsass
Attorney, Agent, or Firm—Evenson, McKeown, Edwards & Lenahan

[57] ABSTRACT

An arrangement for a motor vehicle with a central locking system and an anti-theft alarm system is controlled by a control device which both systems have in common and which monitors the operating condition of the systems. For this purpose, the locked condition and the unlocked condition of all locks or doors of the motor vehicle is monitored by additional switching contacts. A differentiation is made between at least three operating conditions which are indicated by visually distinguishable flashing signals output by electro-optical indicating elements in the door locking buttons by visually distinguishable flashing signals.

11 Claims, 2 Drawing Sheets

MOTOR VEHICLE WITH A CENTRAL LOCKING SYSTEM AND AN ANTI-THEFT ALARM SYSTEM

BACKGROUND AND SUMMARY OF THE INVENTION

The present invention, relates to an arrangement for controlling the central locking system and anti-theft alarm system for a motor vehicle with at least two doors and a closable and lockable trunk. The doors are automatically lockable or unlockable by a central locking system via lock activation by means of key-activated locks in one pair of doors. The central locking system is controlled by a first group of switching contact on the locks. Accessing of the interior of the motor vehicle is monitored by an anti-theft alarm system, an alarm readiness of the anti-theft alarm system being capable of being activated by the switching contacts of the first group of switching contacts during locking, and being capable of being deactivated during unlocking. The triggering of an alarm by the alarm-ready anti-theft alarm system takes place by means of at least one switching contact, which is changed from its inactive into its active condition, of a second group of switching contacts which records the accessing of the vehicle or its unauthorized use. The alarm readiness of the anti-theft alarm system is indicated by flashing of an electro-optical indicating element in the locking buttons of the vehicle doors.

A motor vehicle with a closable and lockable trunk and at least two doors which can be automatically locked and unlocked by means of a central locking system via an activating of a lock by means of key-activated locks is shown in German Patent Document DE 88 46 369 U1. The central locking system is controlled by a first group of switching contacts on the locks. An anti-theft alarm system monitors access to the interior of the motor vehicle. An alarm readiness device of the anti-theft alarm system is activated by the switching contacts of the first group of switching contacts during locking and is deactivated during unlocking. By means of second switching contacts, which register an accessing of the vehicle or its unauthorized use, a triggering of an alarm takes place by means of the alarm-ready anti-theft alarm system.

German Patent Document DE 38 21 561 A1 shows an arrangement for the visual indicating of the readiness of a vehicle alarm system. For this purpose, an electro-optical indicating element, which generates a flashing signal when the anti-theft alarm system is switched to be alarm-ready, is inserted into at least one locking button of a lock of a vehicle door. The indicating element, which is constructed as a light emitting diode, is operated in the pulsed mode with a no-pulse period that is relatively long in comparison to the flashing pulse.

A user-identifying control and safety device for a vehicle is shown in U.S. Pat. No. 4,754,225 in which an alarm system for a vehicle is disclosed that can be activated by means of a remote control unit. Also, a central locking system arranged in the vehicle can be activated by means of the remote control unit. The alarm system monitors the opening condition of the engine hood, the trunk and the vehicle doors as well as the vehicle itself with respect to impacts, movements or breaking glass.

In the case of the above-described systems, it is possible that, in the event of a malfunctioning or a partial malfunctioning of the central locking system, the alarm system and its function indicating will nevertheless be activated and the alarm readiness will be indicated although possibly one or several doors or other openings of the motor vehicle may not be properly locked.

It is therefore an object of the invention to provide a motor vehicle with a central locking system and an anti-theft alarm system in which an operating condition of the central locking system and of the anti-theft alarm system is reliably recognized and indicated.

This and other objects are achieved by the present invention which provides an arrangement for controlling a central locking system and an alarm system for a motor vehicle with at least two doors having locks and locking buttons. The arrangement comprises a central locking system for automatically locking and unlocking the doors via a lock activation by means of the lock in at least one of the doors, and a first group of switching contacts on the locks of the doors and which is coupled to the central locking system, the central locking system being controlled in response to signals from the first group of switching contacts. An anti-theft alarm system monitors accessing of an interior of the motor vehicle, an alarm readiness of the anti-theft alarm system being capable of being activated by the switching contacts of the first group of switching contacts during locking of the doors, and is capable of being deactivated during unlocking of the doors. A second group of switching contacts, coupled to the anti-theft alarm system, records accessing and unauthorized use of the vehicle, with a triggering of an alarm by the alarm-ready anti-theft alarm system taking place by a change from an inactive condition to an active condition of at least one switching contact of the second group of switching contacts. An electro-optical indicating element is provided in at least one of the locking buttons which indicates alarm readiness of the anti-theft alarm system by flashing. A third group of switching contacts monitors a locking condition of the locks of the vehicle. A control device, coupled to the first, second and third groups of switching contacts, determines an operating condition of the central locking system and of the anti-theft alarm system, the control device controlling both the central locking system and the anti-theft alarm system, this control device receiving inputs from the first, second and third switching groups of contacts and differentiating between at least three operating conditions. The operating conditions are: anti-theft alarm system deactivated or defective (first operating condition), anti-theft alarm system activated and locks of the vehicle properly locked (second operating condition), and anti-theft alarm system activated and locks of the vehicle not properly locked (third operating condition). The control device causes the electro-optical indicating element to indicate one of the operating conditions by visually distinguishable flashing signals.

The principal advantages of the invention are that the operating condition of the central locking system and of the anti-theft alarm system is determined by a control device that is common to both systems and this operating condition is indicated by means of visually distinguishable flashing signals by means of electro-optical indicating elements in the door locking buttons. In this case, differentiations are made between at least the following operating conditions:

anti-theft alarm system deactivated or defective;
anti-theft alarm system activated and vehicle locked properly;

anti-theft alarm system activated and vehicle not locked properly.

Other objects, advantages and novel features of the present invention will become apparent from the following detailed description of the invention when considered in conjunction with the accompanying drawings.

DETAILED DESCRIPTION OF THE DRAWINGS

Figure 1:
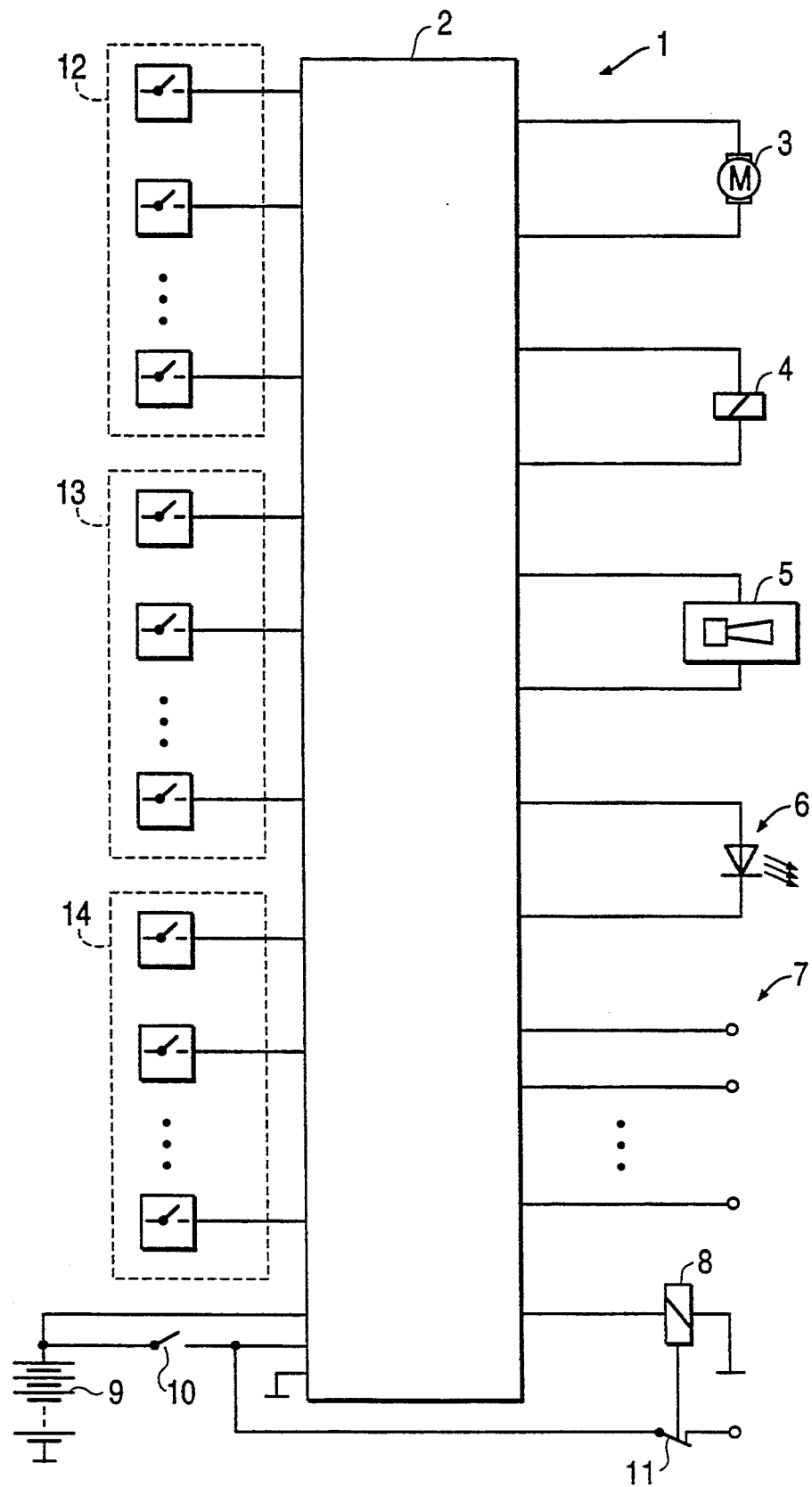
FIG. 1 is a block diagram of a central locking system and an anti-theft alarm system constructed in accordance with an embodiment of the present invention with a control device which both systems have in common.

In FIG. 1, a central locking system and an anti-theft alarm system are shown which have the reference number 1. A control device 2, which both systems have in common, controls one or several electric motors 3 and/or solenoids 4 which are used for the electromechanical or electropneumatic locking and unlocking of the locks in the doors and lids (trunk lid, tank cap, engine hood, etc.). The alarm system part controls one or several indicating elements 5, such as the vehicle horn or the headlights or the flashers of the motor vehicle. Electro-optical indicating elements, which in certain embodiments are light emitting diodes and are arranged in the locking buttons of the vehicle doors, indicate the condition of the overall system.

By way of additional outputs 7, which are controlled by the control device 2, when the alarm system is alarm-ready, additional external monitoring elements, for example, for the ultrasonic monitoring of the vehicle interior (movement reporting device) or for the determination whether the vehicle is being moved away from a parking site, may be actively controlled.

A relay 8 controlled by the control device 2 is used for the drive-away safety of the motor vehicle in that, when the alarm system is switched to be alarm-ready, during the switching-on of the ignition current from a vehicle battery 9, for example, by way of an ignition switch 10, the ignition current is interrupted by means of a break 11 of the relay 8. As a result, the signal of the ignition switch 10 is an input quantity of the control device 2.

The control device 2 is supplied with current via the vehicle battery 9. In addition, for buffer purposes, an accumulator, which is not shown, may be provided in the control device 2.

A first group of switching contacts 12 is assigned to the key-activated locks in at least one pair of the vehicle doors. One of the switching contacts of the first group 12 respectively is activated when the locks are locked and one respectively is activated when the locks are unlocked (controlled to be active). By the activating of these switching contacts 12, the control of the electric motors 3 and solenoids 4 for the locking and unlocking of the vehicle accesses takes place. Likewise, by means of this first group of switching contacts, the alarm readiness of the anti-theft alarm system can be activated during the locking and deactivated during the unlocking.

A second group of switching contacts 13 is used for the monitoring of the access to the vehicle or its unauthorized use when the anti-theft alarm system is switched to be alarm-ready. By means of these switching contacts of the second group 13, particularly the doors, the trunk lid, the engine hood, a filler cap, a cover of the glove compartment, a correct installation of the car radio or an opening of a movable roof part or (by means of the additional external monitoring elements) movements of the vehicle itself or of objects in the vehicle are detected. The triggering of the alarm system and thus the controlling of the reporting elements 5 in this case takes place by changing one of these switching contacts of the second group 13 from an inactive to an active state, for example, by opening a vehicle door. For this purpose, the door switch for the interior vehicle lighting may, for example, be used.

Since, however, the first group of switching contacts 12 causes only controls the central locking system and cannot also monitor its correct functioning (the switching contacts are constructed as tip switches), a third group of switching contacts 14 is provided which monitor the locked condition and the unlocked condition of the motor vehicle and of all doors, lids, or locks. If such a recognition of the signal, which characterizes the locked condition, of the switching contact or contacts of the third group 14 should be absent after at least one key activation of a lock in the locking direction by one of the contacts of the first group 12, an activation of the alarm system is prevented and a corresponding warning signal is emitted via the electro-optical indicating elements 6 in the locking buttons.

If the signal, which characterizes the locked condition, of at least one switching contact of the third group 14 is absent after the recognition of a key activation of a lock in the locking direction by a switching contact of the first group 12, the activation of the alarm system may be permitted by a certain number of (e.g., three) activations of the key-activated lock within a specific limited time period in the locking direction also when at least one vehicle door is unlocked or unlockable or locked manually.

Likewise, it is possible, after the manual locking of all doors, to activate the alarm readiness of the alarm system by an activating of the key-activated lock in the locking direction if the locked condition of all doors is recognized by the switching contacts of the third group 14.

The central locking and alarm system also comprises a considerable number of other functions which will be explained in the following.

Thus, for example, after an inactive period has gone by, after the activating of the alarm system, a triggering of the alarm system may take place by only those switching contacts of the second group 13 which were inactive during the whole inoperative period (doors closed). The other switching contacts can trigger the alarm system only after the transition into the inactive condition or after an inoperative time that has started after it.

If, during an inoperative period after the activating of the alarm system, the ignition lock 10 of the motor vehicle is activated, the alarm system is deactivated. When the ignition lock 10 of the motor vehicle is activated after the inoperative period has ended, the ignition current to an internal-combustion engine of the motor vehicle is interrupted by means of the relay 8 and the break 11, and an alarm is triggered (drive-away safety arrangement).

By activation of a lock, which locks the trunk of a motor vehicle, in the unlocking direction, an already activated alarm system is deactivated at least as long as the corresponding switching contact of the second group which monitors the opened trunk is active.

An external auxiliary device for the monitoring of the motor vehicle may react to movements of the vehicle itself or to movements in the vehicle and may be activated by the outputs 7 by means of the alarm system. The external auxiliary device may also be activated after an inoperative period, if, during the whole inoperative period, all switching contacts of the second group 13 were inactive or after, following the transition of all switching contacts of the second group 13 into the inactive condition, the inoperative period has again elapsed. By the deactivation of the alarm readiness, the external auxiliary device is also switched off.

By way of the second group of switching contacts 13, an attempt to unlock the door while the alarm system is activated may be tested and the alarm system may be triggered.

The common control device 2 also has a self-diagnosis function which, after the activating of the alarm system, tests its overall operatability. Faults in the central locking or alarm system or triggered alarms are stored in a fault storage device of the control device 2 when they arise while the marginal conditions are detected. It is also recorded in the fault storage device that the alarm system could be activated only by a repeated activating of the key-activated lock within a certain time period in the locking direction.

Certain embodiments indicate the operating condition of the central locking and alarm system by means of the light emitting diodes in the locking buttons. For characterizing the respective operating condition, the light emitting diodes are controlled by means of different and distinguishable flashing signals.

The opto-electronic indicating element is, for example, not controlled (first operating condition) when: 1) the anti-theft alarm system is not activated or is defective or when the self-diagnosis during the inoperative time period recognizes faults; or 2) when, in the case of a no-fault self-diagnosis during the inoperative period the central locking system cannot be locked and the key-activated lock was not activated three times within a certain time period in the locking direction; or 3) when active switching contacts of the second group 13 indicate, for example, opened vehicle doors.

When, in the case of a correct functioning of the system, the inoperative period has elapsed and all switching contacts of the second group 13 are inactive, the central locking system is closed and was not locked three times in brief succession, and there is no alarm, the electro-optical indicating elements flash with a normal flashing sequence, in which the switch-on periods are relatively short in comparison to the switch-off periods. The alarm-readiness of the anti-theft alarm system is then activated (second operating condition).

Figure 2:
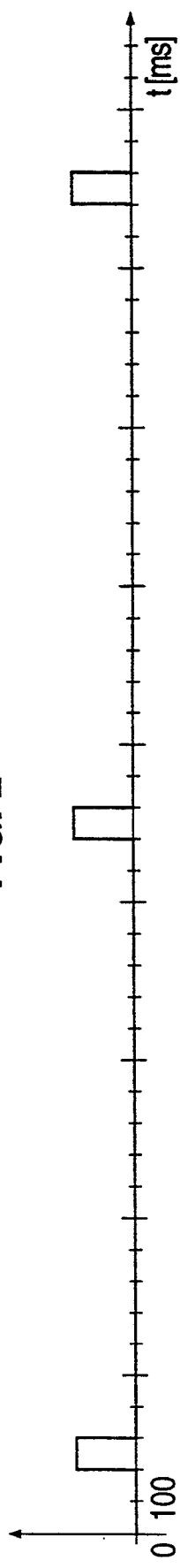
FIGS. 2 to 4 are pulse-time diagrams of flashing signals.

This type of a flashing signal is illustrated in FIG. 2. It shows flashing pulses with a pulse width of 100 msec., which are each followed by first no-pulse periods of a width of 1,900 msec.

When the central locking system was briefly locked three times without the recognition of a fault during the inoperative period, the electro-optical indicating element emits a double flashing signal, these signals being briefly successively controlled twice which is followed by a longer no-flashing pulse period; the alarm readiness is not activated. After the end of the inoperative period, the alarm readiness will be activated but the double flashing signal continues to be emitted. As a result, it is indicated that either a door is not locked or the corresponding signal of the third group of switching contacts is absent (third operating condition).

Figure 3:
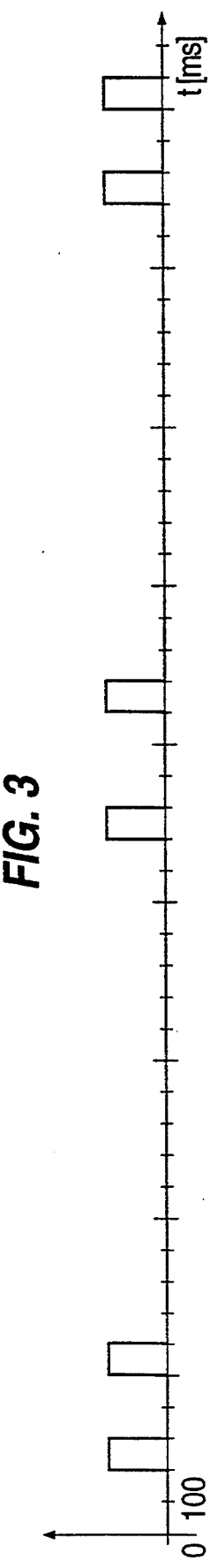

The pertaining flashing signal is illustrated in FIG. 3. Two flashing pulses of a duration of 100 msec. respectively, which follow one another at an interval of 200 msec. (second no-pulse period), are in each case followed by a third no-pulse.

Likewise, a double flashing takes place when, after the end of the inoperative period, switching contacts of the second group 13 are active and thus, for example, indicate an opened vehicle door. Finally, the double flashing takes place during or after an alarm emission.

Figure 4:
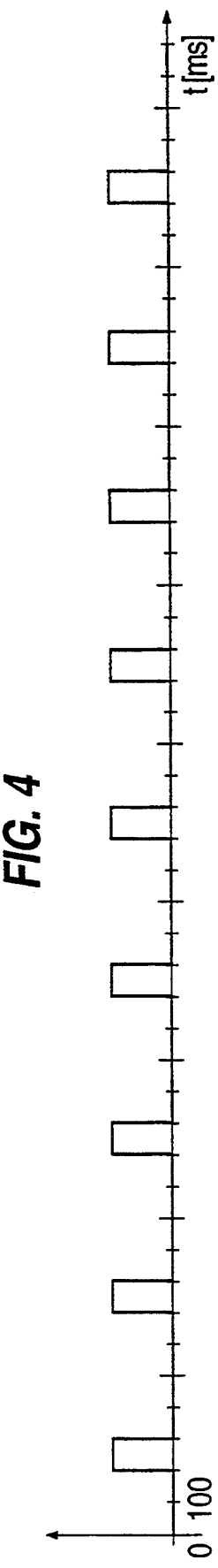

In a fourth operating condition, in which the anti-theft alarm system is activated and the vehicle is locked properly, and an inoperative period has not yet elapsed, the electro-optical indicating elements will flash rapidly; see FIG. 4. A repetitive flashing pulse of a duration of 100 msec. will, in each case, be followed by a fourth no-pulse period of a duration of 400 msec.

Given the signals and the four stated operating conditions, one of ordinary skill in the art can easily program the control device 2 to respond to the three groups of switching contacts to control the flashing sequence of the electro-optical indicating element 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling a central locking system and an alarm system for a motor vehicle with at least two doors having locks and locking buttons, comprising:

a central locking system for automatically locking and unlocking the doors via a lock activation by means of the lock in at least one of the doors;

a first group of switching contacts on the locks of the doors and coupled to the central locking system, the central locking system being controlled in response to signals from the first group of switching contacts;

an anti-theft alarm system that monitors accessing of an interior of the motor vehicle, an alarm readiness of the anti-theft alarm system being capable of being activated by the switching contacts of the first group of switching contacts during locking of the doors, the alarm readiness being capable of being deactivated during unlocking of the doors;

a second group of switching contacts, coupled to the anti-theft alarm system, which records accessing and unauthorized use of the vehicle, with a triggering of an alarm by the alarm-ready anti-theft alarm system taking place by a change from an inactive condition to an active condition of at least one switching contact of the second group of switching contacts; an electro-optical indicating element in at least one of the locking buttons which indicates alarm readiness of the anti-theft alarm system by flashing;

a third group of switching contacts which monitors a locking condition of the locks of the vehicle; and a control device, coupled to the first, second and third groups of switching contacts, which determines an operating condition of the central locking system and of the anti-theft alarm system, the control device controlling both the central locking system and the anti-theft alarm system, said control device receiving inputs from the first, second and third switching groups of contacts and differentiating between at least the operating conditions:

anti-theft alarm system deactivated or defective (first operating condition), anti-theft alarm system activated and locks of the vehicle properly locked (second operating condition), and anti-theft alarm system activated and locks of the vehicle not properly locked (third operating condition), wherein the control device causes the electro-optical indicating element to indicate one of the operating conditions by visually distinguishable flashing pulses.

2. An arrangement according to claim 1, wherein the electro-optical indicating element is not controlled by the control device in the first operating condition.

3. An arrangement according to claim 2, wherein the electro-optical indicating element is operated in the second operating condition with a repetitive pulse signal having a first no-pulse period which is relatively long in comparison to the pulse width of the flashing pulse.

4. An arrangement according to claim 3, wherein the electro-optical indicating element is operated in the third operating condition with a repetitive pulse signal with two flashing pulses, which are separated by a brief second no-pulse period, followed by a third no-pulse period which is relatively long in comparison to the pulse width of the flashing pulses.

5. An arrangement according to claim 4, wherein the control device is capable of determining at least one other operating condition of the central locking system and of the anti-theft alarm system in which the anti-theft alarm system is activated and the vehicle is locked properly, and an inoperative period after the activating of the anti-theft alarm system has not yet elapsed (fourth operating condition).

6. An arrangement according to claim 5 wherein the electro-optical indicating element is operated in the fourth operating condition with a repetitive pulse signal with a flashing pulse, followed by a fourth no-pulse period, whose pulse width is longer than the flashing pulse or the second no-pulse period, however, significantly shorter than the pulse width of the first or third no-pulse period.

7. An arrangement according to claim 1, wherein the control device has a self-diagnosis function which, after the activating of the alarm system, tests operatability of the control device.

8. An arrangement according to claim 1, wherein the electro-optical indicating element is operated in the second operating condition with a repetitive pulse signal having a first no-pulse period which is relatively long in comparison to the pulse width of the flashing pulse.

9. An arrangement according to claim 8, wherein the electro-optical indicating element is operated in the third operating condition with a repetitive pulse signal with two flashing pulses, which are separated by a brief second no-pulse period, followed by a third no-pulse period which is relatively long in comparison to the pulse width of the flashing pulses.

10. An arrangement according to claim 2, wherein the electro-optical indicating element is operated in the third operating condition with a repetitive pulse signal with two flashing pulses, which are separated by a brief second no-pulse period, followed by a third no-pulse period which is relatively long in comparison to the pulse width of the flashing pulses.

11. An arrangement according to claim 1, wherein the electro-optical indicating element is operated in the third operating condition with a repetitive pulse signal with two flashing pulses, which are separated by a brief second no-pulse period, followed by a third no-pulse period which is relatively long in comparison to the pulse width of the flashing pulses.

* * * * *